Nov. 1, 1966     A. MAGG ETAL     3,282,122
REMOTE CONTROL SHIFTING ARRANGEMENT FOR CHANGE
SPEED GEARS OF MOTOR VEHICLES
Filed June 23, 1964     3 Sheets-Sheet 1
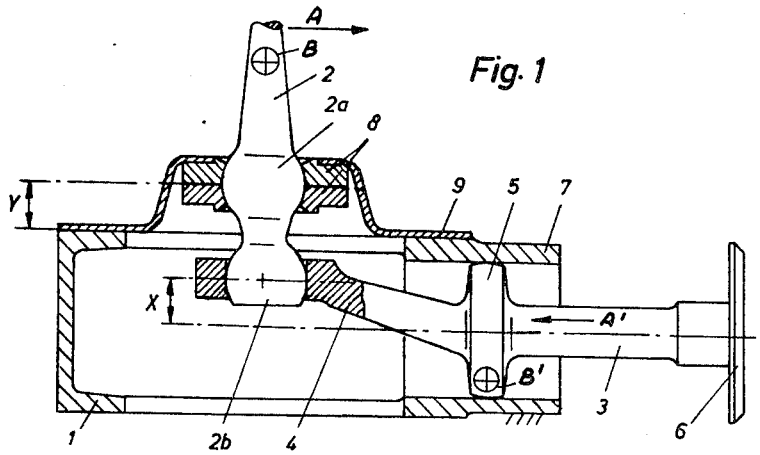
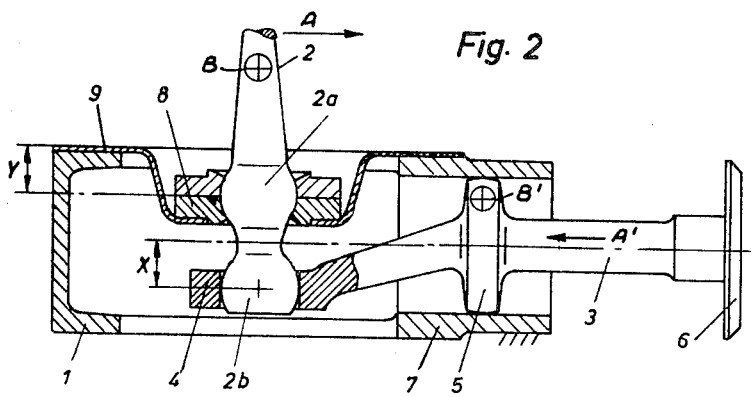
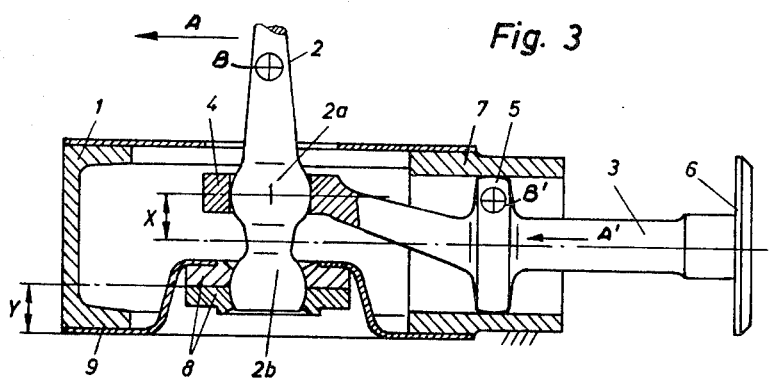
Inventors
ALFRED MAGG
HEINZ HAESSLE
By
Attorney Nov. 1, 1966          A. MAGG ETAL                 3,282,122
          REMOTE CONTROL SHIFTING ARRANGEMENT FOR CHANGE
Filed June 23, 1964        SPEED GEARS OF MOTOR VEHICLES
                                                3 Sheets-Sheet 3

Inventors:
ALFRED MAGG
HEINZ HAESSLE
by: *(signature)*

United States Patent Office 3,282,122
REMOTE CONTROL SHIFTING ARRANGEMENT FOR CHANGE SPEED GEARS OF MOTOR VEHICLES
Alfred Magg and Heinz Haessle, Friedrichshafen, Germany, assignors to Zahnradfabrik Friedrichshafen Aktiengesellschaft, Friedrichshafen, Germany
Filed June 23, 1964, Ser. No. 377,347
Claims priority, application Germany, June 26, 1963, Z 10,194
9 Claims. (Cl. 74—473)

This invention relates to gear transmissions and more particularly to mechanisms for effecting the shifting of gears to various speeds by means of a gear shift lever disposed at a distance from the gear box.

The invention has a twofold purpose of providing a mounting means for a shifting lever of considerable versatility in that it may be assembled in various ways to suit various vehicle constructions and used at a point remote from the gear box by transmitting force through a novel arrangement affording movement in two planes with a minimum of side forces or frictional forces with which to contend.

In prior art mechanisms gear shift lever mountings have been provided with ball joints to permit universal movement and directly connected with gear shifting rods or indirectly connected via an intermediate element, but wherein the mechanisms produced an eccentric or off-center force owing to the geometry of the arrangement, which causes considerable friction. Various modes of overcoming this problem have relied on universal joints which are, of course, expensive, or the special design of the lever mounting and force transmittal mechanism to suit various types of vehicles.

It is a primary purpose of the present invention to provide a gear shift lever mount comprised of an organization of elements which can be assembled in various ways to suit various vehicle constructions and wherein the frictional forces involved are minimized.

It is another object of the invention to provide a simple mechanism for effecting remote control of gear shifting from a lever which may be separated at any desired distance from the gear box.

It is a still further object of the invention to provide a combination of elements for the purposes described which may be manufactured at low cost and used in conjunction with standard or non-standard shift rod movements.

Briefly, the invention comprises a combination of gear shift lever mounts wherein the lever is provided with two spherical portions or sections of the same diameter carried in complementary sockets, one such socket being at the end of an offset arm carried by a shaft to be actuated for effecting shifting of gears, and the other such socket being fixed to serve as a fulcrum. The fixed socket is carried in a cover plate of a housing and can be secured thereto in different positions on either of two sides over apertures therein to vary the fulcrum point, the lever extending through either aperture into the housing.

This choice of arrangement, coupled with placement of the other socket at the end of the offset arm, provides a wide variety of installation possibilities as well as variation in directional movement to suit different shift motion patterns. In addition to the preceding structure, the shaft thus moved by the gear shift lever may be of extended length for connection to a sliding and rotative gear selector and actuating rod in the gear box, the arrangement being such that bearing forces are minimized by the use of a transverse support rod having one end pivoted at a fixed point and the other end pivoted to the aforementioned shaft.

The transverse support rod takes side strains imposed on the shaft and moving parts of the mechanism and effects a generally improved arrangement.

A detailed description of the drawing now follows in which:

FIG. 1 is an elevational cross-section of the basic components of the lever mount wherein the cover member of the housing is secured at the top thereof with the fulcrum socket being carried thereby outside of the housing and with the shaft socket being carried eccentrically in an offset arm above the center line of the shaft.

FIGS. 2, 3 and 4 show variations in assembly of the several components illustrated in FIG. 1, all by way of cross-sectional elevation views.

Figure 4:
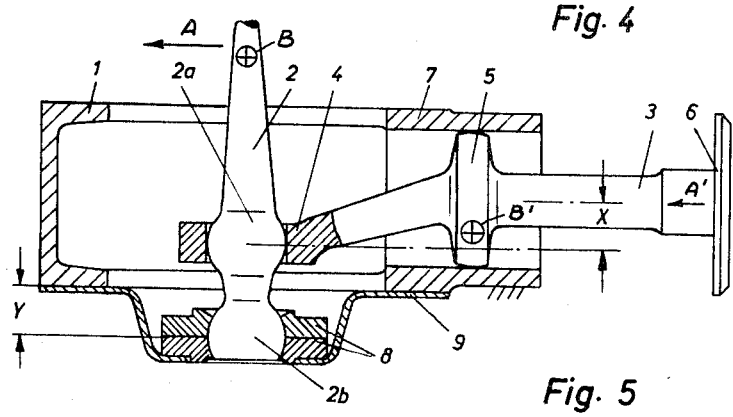

One particularly important feature of the invention is the fact that a non-standard shift can be operated in accordance with the motions of the lever for standard shift by proper assembly of the several components which make up the lever support. Further, by placing the spherical portions of the lever close together a very great mechanical advantage can be achieved as will be obvious from what follows.

Referring now to FIG. 1, the basic components of this phase of the invention comprise a housing 1 which will be understood to be fastened in a vehicle aft any suitable point where it is desired to rotate the gear shift lever 2. The gear shift lever 2 has a ball section 2a integral therewith carried in the ball socket 8 which is integral with the housing cover 9 which will be understood to be secured to the housing. The lower end of the lever carries another ball section 2b which is the same diameter as the ball 2a and which is socketed in a bore at the outer end of an offset arm 4 which stands off eccentrically from a gear selector and actuating rod 3 having a generally spherical collar 5 movably carried within the fixed guide sleeve 7 integral with the housing.

The actuating rod 3 is integral with arm 4 and has a flange 6 at its outer end for connection to an extended rod which effects gear selection and engagement in a manner to be described. It will be noted that the spherical socket 8 is comprised of two parts and it will be understood that such parts are assembled in any conventional manner around the ball 2a and fastened within a suitable aperture in a portion of the cover which, in the case of FIG. 1, stands above the housing 1.

It will be further noted that the housing 1 is open at both sides, that is, the upper and lower sides have apertures.

Still referring to FIG. 1, the arrangement of the components being as shown, with the center of the socket in the offset arm 4 a distance X above the axis of the actuating shaft 3 and the fulcrum for the lever 2, i.e., the center of the socket 8 at the distance Y above the housing, it will be apparent that rocking of the lever in the direction A will cause movement of the actuating rod 3 in the direction A′. In other words, this is a reversal of motion directions. On the other hand, if the lever be rocked into the plane of the paper as indicated by the arrowtail B, then the shaft 3 will rotate in the opposite direction as indicated by the arrowtail B′ for the reason that the arm 4 is offset upwardly in a vertical plane from the axis of shaft 3. In other words, a reverse rotation between the lever and actuating rod is effected as well as reverse reciprocation between these two elements by the arrangement of FIG. 1.

In FIG. 2 the cover 9 has been reversed, as has the offset arm 4. Thus, the cover 9 is now situated such that the center of the ball 2a is at the distance Y below the housing top surface and the center of the ball 2b is eccentrically displaced below the axis of the actuating rod by the distance X. In this instance, the reciprocal movement of the lever and the shaft are in opposite directions as indicated by the arrows A and A' but the rotational directions are now the same as indicated by the arrowtails B and B'.

The arrangement in FIG. 3 provides for the cover now being at the bottom of the housing and protruding into the housing so that the center of the ball 2b is at the distance Y above the housing bottom and the center of the ball 2a is at the distance X from the axis of rod 3, the arm 4 having been reversed as compared with FIG. 2. It will be apparent that if the lever is rocked in the direction of the arrow A it will effect reciprocal movement of the rod 3 in the same direction, and that, if the lever be rocked into the plane of the paper, the rotational direction of the shaft will be in the same direction, as indicated by the arrowtails B and B'.

Referring to FIG. 4, the cover 9 is still attached at the bottom of the housing, but reversed as compared with FIG. 3 so that the center of ball 2b is now at the distance Y below the housing. The arm 4 has likewise been reversed as compared with FIG. 3 so that the center of the ball 2a is now at the distance X below the axis of the rod 3. With this arrangement, rocking of the lever in the direction A will still produce movement of the rod in the same direction A'. However, rotation of the actuating rod 3 will be opposite to that of lever 2, from comparison of the arrowtails B and B'.

It will be noted that in each instance the distance $X=Y$. In other words the amount of offset of arm 4 from the axis of rod 3 to the center of ball section 2a or 2b is the same as the distance from the top or bottom of the housing to the center of ball section 2a or 2b, depending on mode of assembly.

Figure 5:
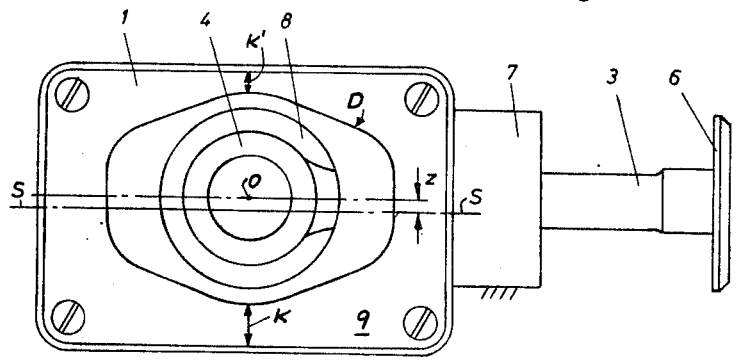
FIG. 5 is a plan view of the same components illustrating an assembly arrangement wherein the axis of the shaft coincides with the axis of the housing bore in both vertical and horizontal planes.
Figure 6:
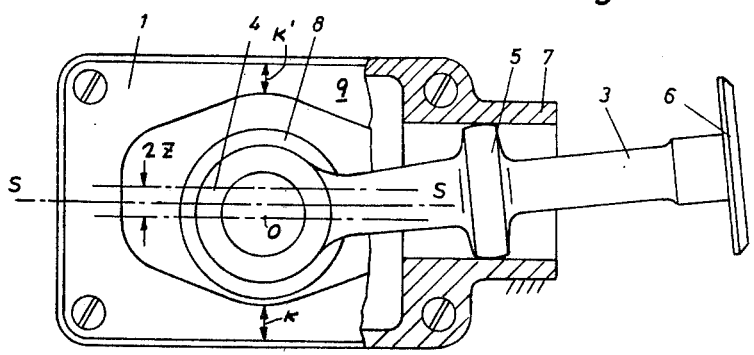
FIG. 6 is a plan view in which the cover components have been fastened to the housing in a 180° orientation as compared with FIG. 5 and thereby effects an eccentricity of the shaft.

The cover is dished in such a manner that the depression which carries the fixed socket 8 is axially spaced with respect to a line S—S (FIG. 5) which passes through the geometric center of the cover. Thus, the boss or depression D, as shown on FIG. 5, which is of roughly rectangular shape although bulging at the sides, is spaced at a distance K, larger on one side than the distance K' at the other side, relative to the long edges of the cover. Since the fixed socket 8 is symmetrical with respect to the geometry of the depression, it follows that the center of that socket, namely, a vertical axis 0 as seen on FIG. 5, is displaced from the line S—S by a distance Z. Further, FIG. 6 will make it clear that the axis of the sleeve 7 is likewise displaced to the same extent Z with respect to the true median line S—S of cover 9, which line is the trace of a bisecting plane of the cover and housing. Accordingly, the degree of displacement Z in FIG. 5 above the line S—S for the vertical axis of the socket 8, and hence the axis of ball 2b of the arrangement shown, say, in FIG. 4, is the same as the displacement Z below the line S—S in FIG. 6. It therefore follows that if the cover 9 be placed in position as shown in FIG. 5, the displacement Z for the two displacements cancel each other; in other words, the axis of ball 2b is brought into the same vertical plane that contains the axis of the sleeve 7 as well as the axis of the rod 3, inasmuch as the rod and the sleeve are co-axial when the rod is in straight position therein. Accordingly, such assembly of the cover plate with respect to the housing may be used in conjunction with any of the assemblies of FIGS. 1–4, although the view of FIG. 5 assumes the assembly of FIG. 4 for the reason that the arm 4 and the socket 8 are visible in solid lines.

Where it is desired to have an obliquely disposed rod 3 it is merely necessary to rotate the cover 9 end for end, 180°, relative to the axis 0 of socket 8 and then fasten it to the housing. This will displace the axis 0 by a distance equal to 2Z with respect to the original position for the axis 0 as shown in FIG. 5, as will be obvious from comparison of FIGS. 5 and 6. Such mode of assembly may be useful in various applications depending on location problems of the manual lever.

Figure 7:
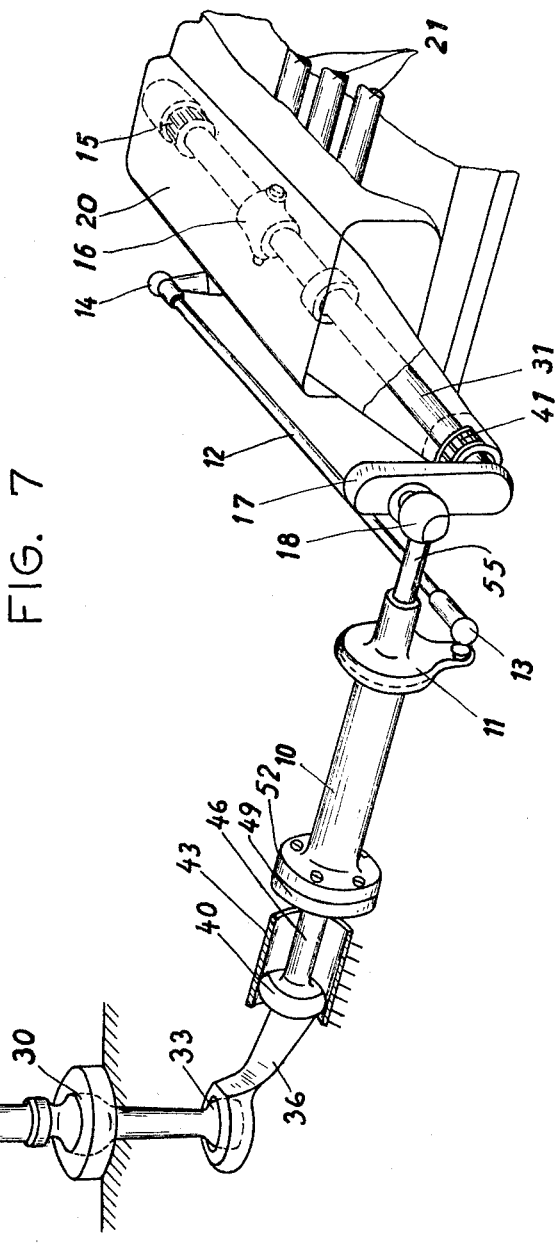
FIG. 7 is a perspective view showing an arrangement whereby a device of the type shown in FIGS. 1 through 6 can be connected to a remote gear box for effecting gear selection and engagement.

Referring to FIG. 7, a shift lever 19 is secured by a ball joint 30, assumedly to the floor of a vehicle or the like, the lever extending therebelow and terminating in a further ball point 33, the outer collar of which is integral with an arm 36 having a bearing collar 40 which can rotate or slide in a fixed sleeve 43 and which has integrally extended shaft 46 secured to a flange 49. Thus the construction coincides generally with FIGS. 1–6, as thus far described. Flange 49 is secured to a flange 52 as by bolts or the like.

Lever 19 can rock in either direction of the arrow A or in either direction of the arrow B. In the former direction, it will produce rotation of the shaft 46 and in the latter direction it will reciprocate that shaft.

Flange 52 is integral with a shaft 10 having an integral lever 11 into the outer end of which is screwed a short shart 55 so as to be permanently attached thereto. The other end of shaft 55 has a ball joint connection 18 with a rocking finger 17 normal to and integrally secured to a gear selector and actuating rod 31 which is rotative and reciprocal on bearings 15 and 41 carried in a gear housing 20.

Rod 31 carries a cam 16 which will be understood to be operative in a conventional manner for engaging and shifting the rods 21 of a gear transmission. Thus, cam 16 can be reciprocated along with rod 31 when lever 19 is rocked in either direction of the arrow A to select a rod 21 for gear selection, and cam 16 can then be rotated by rocking lever 19 in either direction of arrow B to reciprocate the selected rod 21 for effecting engagement of the selected gear via shaft 10.

The particular improvement of this phase of the invention resides in combining the above-described components with a pivotal support rod 12 having a ball joint connection 13 with the lever 11 at one end and another ball joint connection 14 at a fixed point such as the end of fixed housing 20. Thus, the rod 12 takes a side thrust or pull when the lever 19 is rocked in either direction of the arrow A and regardless of where the lever 19 may be in the arc of the arrow B. The double universal joint arrangement 13, 14, permits such universal motion of the thrust rod 12 as to permit it to effect its function for any position of the lever 19.

Accordingly, it will be aprreciated that little or no side thrust or reaction is experienced by any of the components except for the rod 12 due to its proximity to the point of force application, i.e., the rod 31, and, accordingly, considerable wear is minimized on the other moving parts while at the same time manual force necessary to effect movement of lever 19 is reduced since there are no major rubbing surfaces taking any side thrust, the side thrust reaction being only in the relatively easy movable ball joints 13 and 14.

From the above description it will be apparent that a manually operable gear shift lever can be located at a desired point in a vehicle remote from the gear box and that by a judicious assembly arrangement any desired direction of motions of a rod or shaft extending therefrom can be achieved in a structurally simple mechanism having a single guide sleeve and a collar bearing therein of rounded periphery which may translate, rotate, or swivel in fully universal motion so as to co-act with the lever motion for guidance and bearing support of the shaft in a fully universal manner. It will further be appreciated that remoteness of the manually movable lever from the gear box is no problem with a device as described hereinabove by virtue of the support rod connected for universal movement between the aforementioned shaft and a fixed point.

Thus, the improvements effected over conventional constructions, for example, as shown in German Patent #1,123,216 of August 16, 1962, will be readily apparent wherein it will be seen that in such constructions heavy frictional side forces are brought to bear between the ball joint and the selector rod and that the distance between the upper and lower ball joints is such as to require considerable manual force as compared with the present invention to effect shifting. In other words, the lower ball joint in the patent has a disadvantage in leverage which must be offset by using a relatively long hand lever above the fulcrum ball joint. This, of course, is awkward where compactness is required, especially in small vehicles, a drawback overcome by the present invention.

Having thus described our invention we are aware that various changes may be made without departing from the spirit thereof, and therefore we do not seek to be limited to the precise illustration herein given, except as set forth in the following claims.

We claim:
1. A remote control shifting mechanism for a gear transmission comprising a manually operable shifting lever and means for supporting the lever for universal motion, a shaft connected to said lever and means for mounting said shaft for rotational and reciprocal movement responsive to rocking of said lever in a respective plane, means comprising a universal joint for connecting said shaft to a gear selecting and actuating rod and means for mounting said latter rod for reciprocal and rotative motion for selecting and actuating gear shift rods, and a support rod means connected between said first-mentioned shaft and a fixed point, whereby motion of said first-mentioned shaft is supported as to side forces by said support rod.

2. A mechanism as set forth in claim 1, said support rod means having ends and a pivotal mount at each end.

3. A mechanism as set forth in claim 1, said shaft having a lever, one end of said support rod being secured thereto at a point spaced from the axis of said shaft.

4. A mechanism as set forth in claim 3, a gear housing, said selecting and actuating rod being carried therein, the other said end of said support rod being secured to said housing.

5. A gear shift change device comprising
(a) a support base,
(b) a shift lever supported thereby and having a first and a second ball section,
(c) a first socket means carried in a predetermined position relative thereto,
(d) said first ball section being in said first socket means,
(e) a rod to be actuated for effecting gear shifting and having an offset arm carrying a second socket means,
(f) said second ball section being in said second socket means to actuate said rod,
(g) means for supporting said rod in selectively oriented rockable positions wherein said offset arm is disposable in selective planes,
(h) means for securing said first socket means relative to said base in selective planes, whereby either of said ball sections may coact with said second socket means in either of two planes to actuate said rod.

6. A gear shift device as set forth in claim 5, said base having two sides,
(i) said means for securing said first socket means comprising
(j) a plate-like support element, and said first socket means being carried thereby out of the plane of said support element wherein said support element is reversibly securable to each of the two sides of said base.

7. A gear shift device as set forth in claim 6, said means for supporting said rod including pivotal support means for universal and reciprocal movement of said rod and also for rotative movement on an axis wherein said second socket means can be selectively disposed in either of said planes.

8. A gear shift device as set forth in claim 5,
(k) said means for supporting said rod including pivotal support means for universal and reciprocal movement of said rod and also for rotative movement on an axis wherein said second socket means can be selectively disposed in either of said planes.

9. A gear shift device as set forth in claim 5,
(l) said means for securing said first socket means comprising a support,
(m) said support being reversibly securable to said base so that said socket member is disposable at either of two differently spaced positions relative to said second socket means when said support is secured to said base,
(n) said means for supporting said rod including support means for universal and reciprocal movement.

References Cited by the Examiner

FOREIGN PATENTS 1,002,375 3/1952 France.
274,637 7/1927 Great Britain.

MILTON KAUFMAN, *Primary Examiner.*